(12) United States Patent
Ahmed et al.

(10) Patent No.: US 10,221,079 B2
(45) Date of Patent: Mar. 5, 2019

(54) MICROWAVE-ASSISTED DISTILLATION SYSTEM

(71) Applicant: KING ABDULAZIZ UNIVERSITY, Jeddah (SA)

(72) Inventors: Iqbal Ahmed, Jeddah (SA); Khaled Saeed Balkhair, Jeddah (SA); Mohammad H. Albeirutty, Jeddah (SA)

(73) Assignee: King Abdulaziz University, Jeddah (SA)

( * ) Notice: Subject to any disclaimer, the term of this patent is extended or adjusted under 35 U.S.C. 154(b) by 217 days.

(21) Appl. No.: 15/257,746

(22) Filed: Sep. 6, 2016

(65) Prior Publication Data

US 2018/0065865 A1    Mar. 8, 2018

(51) Int. Cl.
| | | |
|---|---|---|
| *C02F 1/04* | (2006.01) | |
| *B01D 3/02* | (2006.01) | |
| *B01D 3/42* | (2006.01) | |
| *B01F 13/08* | (2006.01) | |
| *C02F 1/18* | (2006.01) | |
| *C02F 1/28* | (2006.01) | |
| *C02F 1/44* | (2006.01) | |

(52) U.S. Cl.
CPC .............. *C02F 1/043* (2013.01); *B01D 3/02* (2013.01); *B01D 3/42* (2013.01); *B01F 13/0818* (2013.01); *C02F 1/18* (2013.01); *C02F 1/283* (2013.01); *C02F 1/444* (2013.01); *C02F 2201/009* (2013.01); *C02F 2209/02* (2013.01); *C02F 2209/42* (2013.01)

(58) Field of Classification Search
CPC .............. C02F 1/043; B01D 3/02; B01D 3/42
See application file for complete search history.

(56) References Cited

U.S. PATENT DOCUMENTS

| | | | | |
|---|---|---|---|---|
| 4,089,749 A | * | 5/1978 | Karamian | ................ B01D 3/00 202/176 |
| 4,247,369 A | * | 1/1981 | Bean | .................... B01D 1/0017 202/176 |
| 4,313,786 A | * | 2/1982 | Smith | .................. B01D 1/0017 159/22 |
| 4,313,798 A | | 2/1982 | Myers, Jr. | |
| 4,826,575 A | | 5/1989 | Karamian | |
| 5,164,049 A | * | 11/1992 | Clark | ....................... B01D 1/02 134/12 |

(Continued)

*Primary Examiner* — Jonathan Miller
(74) *Attorney, Agent, or Firm* — Richard C. Litman

(57) ABSTRACT

The system includes a tank for receiving water, a microwave unit having a plurality of sides, one of the sides having a first opening and a second opening, the microwave unit housing a vessel for receiving water from the tank, the vessel having a lid including an inlet port extending through the first opening and an outlet port extending through the second opening, the inlet port of the vessel being positioned in fluid communication with the tank, a magnetic stirrer having a stir bar immersed in the water contained in the vessel, and a condenser unit having a natural convection condenser positioned within a first tube, an adapter, and a heat exchange coil having an inlet configured for receiving water from the tank and an outlet for discharging water to the tank, the condenser unit being positioned in communicating relation to the outlet port of the vessel.

5 Claims, 1 Drawing Sheet

(56) References Cited

U.S. PATENT DOCUMENTS

| | | | |
|---|---|---|---|
| 5,338,409 A | 8/1994 | Heierli | |
| 5,340,444 A * | 8/1994 | van der Heijden | B01D 3/10 202/183 |
| 5,711,857 A * | 1/1998 | Armstrong | B01D 1/0017 159/DIG. 26 |
| 5,750,008 A * | 5/1998 | Lautenschlager | B01D 3/10 202/185.1 |
| 5,858,178 A * | 1/1999 | Lautenschlager | B01J 3/04 159/22 |
| 6,015,968 A | 1/2000 | Armstrong | |
| 6,290,819 B1 * | 9/2001 | Land | B01D 3/42 202/181 |
| 6,294,054 B1 * | 9/2001 | Sutter | B01D 3/10 202/176 |
| 6,830,661 B1 * | 12/2004 | Land | B01D 1/0017 202/176 |
| 7,119,312 B2 | 10/2006 | Sedlmayr | |
| 2007/0095823 A1 | 5/2007 | Sedlmayr | |
| 2009/0134152 A1 | 5/2009 | Sedlmayr | |

* cited by examiner

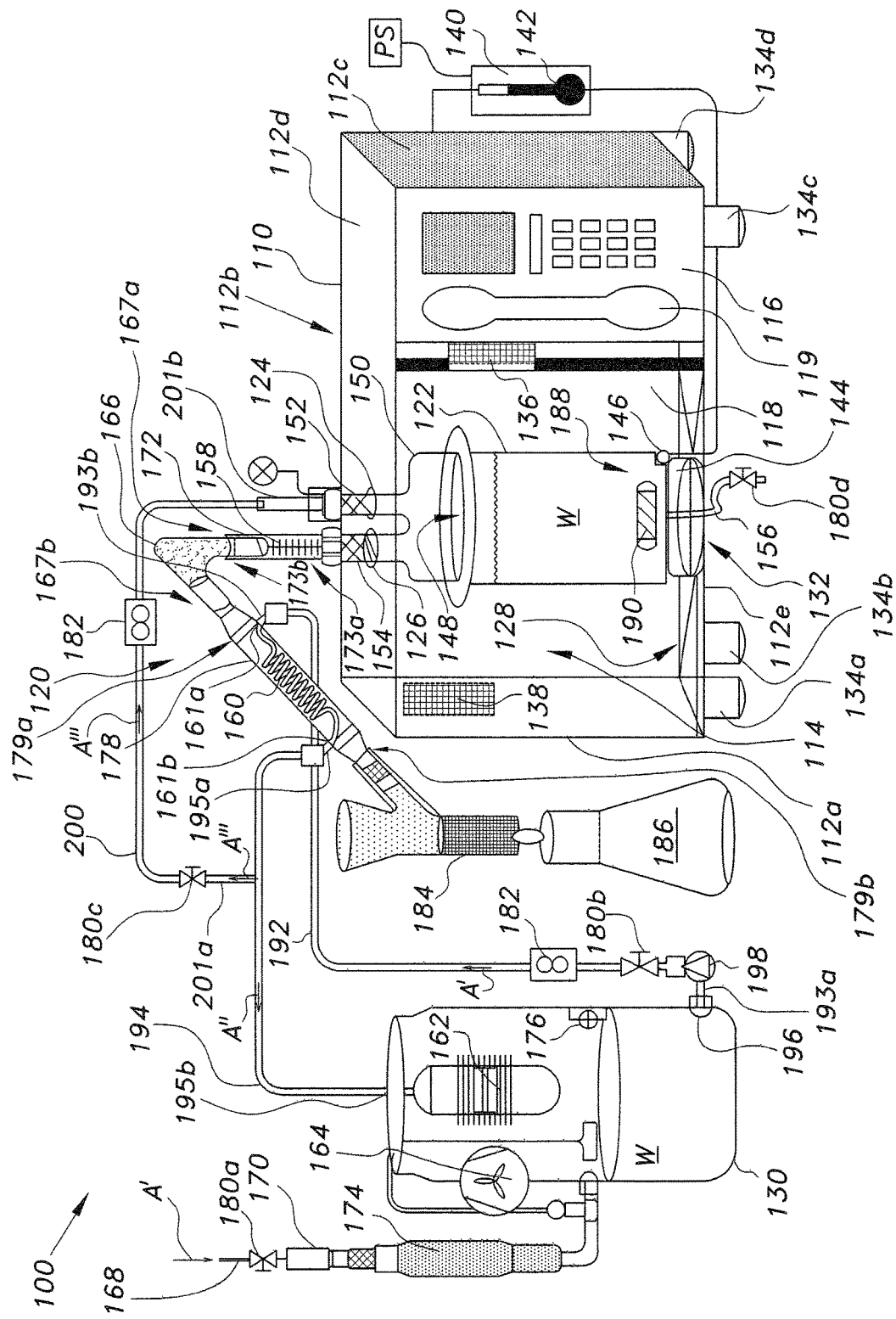

MICROWAVE-ASSISTED DISTILLATION SYSTEM

BACKGROUND OF THE INVENTION

1. Field of the Invention

The present invention relates to distillation systems, and particularly to a microwave-assisted distillation system for producing distilled water.

2. Description of the Related Art

Water, such as ordinary tap water, in many research institutes typically contains carcinogens, suspended solids and chemicals compounds, as well as bacteria and/or viruses. Such chemicals, including chlorine, sulfates, and some lighter iron oxides, tend to give the water a foul smell and a very distinct taste, such as the taste of decomposed eggs resulting from sulfates. Chlorine is typically mixed with water at water purification plants so as to improve the quality of the water. However, after passing through the miles of water supply pipes, such as from the plant to the end users, chlorine tends to separate from the water and vary the overall taste. These chemicals, therefore, need to be removed from the water prior to distillation, such as by degasifying the water before it is distilled. If the chemicals are not removed, the chemicals will be distilled along with the water. Since most of the unpleasant tasting chemicals are more volatile than water, the water is typically heated to a temperature below its boiling point to evaporate the unpleasant tasting chemicals. Other chemicals, such as the heavier iron oxides, can be removed during the distillation process.

A variety of water purification devices and small stills for use in the home have entered the market place. These devices typically include a boiler or container for water and a heater for converting the water into steam which is then condensed into a pure product by the cooling action of air or water. The heat has usually been provided by an electrically powered resistance element. These devices not only use a lot of energy and take a lot of time to boil the water, but also tend to overheat whenever the boiler is empty.

Although microwave energy has been used in the past for heating solids and fluids, there are several problems with heating water in a microwave, namely, the super-heated water problem. That is, water will heat to over the boiling temperature of water at sea level of 100° C. without boiling, or going into steam. Other problems include the absence of a stirring system to allow the fluid to reach a uniform temperature, the need of continuous wastewater to condense the vapors of purified water, as well as the inability to remove bacteria and create endotoxin-free water. Other systems are not only difficult to assemble, as well as costly to manufacture, repair, and clean, but are also inefficient when dealing with water, such as from sugar care syrup and beverages, such as citrus juices.

Thus, a microwave-assisted distillation system solving the aforementioned problems is desired.

SUMMARY OF THE INVENTION

The microwave-assisted distillation system includes a tank for receiving water, a microwave unit having a plurality of sides, one of the plurality of sides having a first opening and a second opening, the microwave unit housing for holding a vessel for receiving the water from the tank, the vessel having a lid including an inlet port extending through the first opening and an outlet port extending through the second opening, the inlet port of the vessel positioned in fluid communication with the tank, a magnetic stirrer having a stir bar immersed in the water contained in the vessel, and a condenser unit having a natural convection condenser positioned within a first tube, an adapter, and a heat exchange coil having an inlet configured for receiving water from the tank and an outlet for discharging water to the tank, the condenser unit positioned in communicating relation to the outlet port of the vessel.

These and other features of the present invention will become readily apparent upon further review of the following specification and drawings.

BRIEF DESCRIPTION OF THE DRAWINGS

The sole drawing FIGURE is a schematic illustration of a microwave-assisted distillation system according to the present invention.

DETAILED DESCRIPTION OF THE PREFERRED EMBODIMENTS

Referring to the sole drawing, a microwave-assisted distillation system 100 is generally illustrated. The system 100 includes a tank 130 configured for receiving water W, such as ordinary tap water, a microwave unit 110 housing a vessel 122, the vessel 122 being configured for receiving feed water W from the tank 130, a condenser unit 120 positioned in communicating relation to the vessel 122, the condenser unit 120 having a heat exchange coil 160, and a magnetic stirrer 188 having a stir bar 190 immersed in the water contained in the vessel 122.

The microwave unit 110, such as a conventional microwave oven, includes a plurality of side walls, such as side walls 112a, 112b, and 112c, as well as a top wall 112d and a bottom wall 112e, configured to enclose an interior cavity 114, a control panel 116, as well as an access door 118 having a door handle 119. The interior cavity 114 of the microwave unit 110 is configured for housing the vessel 122 configured for receiving the water W from the tank. The top wall 112d of the microwave unit 110 includes a first opening 124 and a second opening 126. The bottom wall 112e includes an interior side 128 and an exterior side 132, the exterior side 132 including a plurality of support members, such as support member 134a, 134b, 134c, 134d, so that the microwave unit 110 does not lay flat against a surface, such as a counter top. Each of the support members 134a-134d can be adjustable to elevate the microwave unit 110 to a desired height.

The microwave unit 110 also includes a magnetron 136 having a suitable power distribution and an ventilation opening 138 configured for ventilating the interior cavity 114 of the microwave unit 110. The magnetron 136 is configured for producing microwave radiation within the interior cavity 114 of the microwave unit 110 to heat the water W contained within the vessel 122 to a predetermined temperature, such as 100° C., to cause the water W contained within the vessel 122 to evaporate.

It is to be noted that the nominal power of the microwave unit 110 can have any suitable wattage, such as 900 watts (50 Hz). Prior to distilling water it may be necessary to determine the actual power output, which can be different from the declared capacity indicated by the manufacturer due to the modification process. As such, prior to the distillation process, the system 100 may be calibrated at each pulse level. Table 1 illustrates the power distribution of each magnetron pulse.

TABLE 1

Magnetron Pulse Characteristics

|  | Power Level (watts) | | | | |
| --- | --- | --- | --- | --- | --- |
|  | Low 250 | Med. Low 400 | Medium 550 | Med. High 700 | High 900 |
| Total Pulse Per 60 sec. | 3 | 3 | 3 | 3 | Full |
| Radiation Time Per Pulse (sec.) | 4 | 8 | 12 | 16 | 60 |
| Total Heat ° C./60 sec. | 12 | 24 | 36 | 48 | 60 |
| Off Time Per Pulsed (sec) | 16 | 12 | 8 | 4 | 0 |
| Total Off Time In 60 sec. | 48 | 36 | 24 | 12 | 0 |

The calorimetric method can be used to measure the power output for a microwave oven for both manufacturers and researchers and is incorporated herein by reference. For example, 500 grams of water W having an initial temperature of approximately 26° C. may be poured into the tank 130. Prior to noting the initial temperature of the water W, the water W may be stirred. Both the initial and final temperatures are then recorded using the power of the magnetron 136 and a temperature controller 140 having a thermometer 142, discussed further below, which may be coupled to a meter, such as an analog digital meter.

During the experiment, all the temperatures are recorded by the digital meter at atmospheric pressure during the distillation process. The power absorbed, $P_{absorbed}$, is calculated using equation (1) for the various heat pulses:

$$P_{absorbed} = \frac{\Delta T}{t} \times K \sum C_{p,i} m_i. \quad (1)$$

Tables 2 and 3 illustrate the calibration and performance of the system 100 containing 500 ml of water W. In all the tests, the input power was noted at low-high pulse. Distillation of raw water at each impulse level was carried out in triplicate readings, and the mean value was recorded. The source input voltage was 220V at 50 Hz. The experimental results show the maximum output power of existing microwave ovens to be 870 W, which is 93.4% of nominal value of 900 W. The rate of temperature change as time increases and as the microwave pulses increase was also noted.

TABLE 2

Microwave oven modified to heat water (500 gm) at 26° C.

| Heat Pulse | Time, t (Sec.) | Initial Temp. T₀ (° C.) | Final Temp. T_f (° C.) | ΔT (° C.) | ΔT/t (° C./Sec) | P_absorb (Watts) |
| --- | --- | --- | --- | --- | --- | --- |
| Low | 60 | 26 | 30 | 4 | 0.06 | 138.03 |
| Med. Low | 60 | 28 | 36 | 8 | 0.13 | 278.15 |
| Med. | 60 | 35 | 47 | 12 | 0.20 | 418.27 |
| Med. High | 60 | 45 | 62 | 17 | 0.28 | 591.85 |
| High | 60 | 60 | 85 | 25 | 0.41 | 870.01 |

TABLE 3

Comparison of Present System to Conventional System

| Specification | Conventional System | Present System |
| --- | --- | --- |
| Output | 4 liters/hr, single distilled | 12 liters/hr, double distilled |
| pH | 5.0-6.5 | 6.5-7.0 |
| Conductivity μScm | 3.0-4.0 | 0.1-0.2 |
| Resistivity mOhm-cm | 0.25-0.3 | 0.25-0.3 |
| Temperature | 25° C.-35° C. | 25° C.-30° C. |
| Pyrogen Content | Pyrogen Free | Pyrogen Free |
| Water Supply | 1 liter/min, 3-100 psi, (20-700 kPa) | Fill the tank once at a time |
| Electricity Supply | 220 or 240 V, 50-60 Hz, single phase | 240 V, 50 Hz |
| Power Requirement Electricity | 3000 W | 900 W |
| Consumption | 3000 W/240 min | 900 w/24 min |
| Unit Cost RM | 7200 | 2500 |

The vessel 122, such as a Pyrex® jar, can hold any suitable amount of water W, such as ordinary tap water, preferably up to 1 liter. The vessel 122 is positioned on a magnetic plate 144 positioned on the interior side 128 of the bottom wall 122e of the microwave unit 110. Further, the vessel 122 is positioned in communicating relation to a temperature sensor 146 configured to measure the temperature of the water W inside the vessel 122, the temperature sensor 146 being positioned in communicating relation to the temperature controller 140. The temperature controller 140 is positioned outside of the microwave unit 110. The temperature controller 140 is operatively connected to a power supply PS configured for powering the magnetron 136 positioned inside the interior cavity 114 of the microwave unit 110. For example, when the temperature of the water W inside the vessel 122 falls below a given temperature, such as its boiling point, the temperature sensor 146 communicates the temperature to the temperature controller 140, which, in turn, activates the magnetron 136 to increase the temperature inside the interior cavity 114 and bring the water W inside the vessel 122 to a boil. The power source PS can be a generator, as well as solar panels or wind turbines.

The vessel 122, configured for holding the water W that is to be distilled, includes an opening 148. A lid 150 is coupled to the opening 148 of the vessel 122, such by a clamp or any other type of fastener suitable for sealing the lid 150 onto the opening 148 of the vessel 122, to prevent vapor from escaping from between the lid 150 and the vessel 122 once the water W inside the vessel 122 boils. The lid 150 includes an inlet port 152 configured for receiving the water W to be distilled from the tank 130 and an outlet port 154 configured for releasing the vapor into the condenser unit 120.

Each port 152, 154 is configured to extend through the first opening 124 of the top wall 112d of the microwave unit 110 and through the second opening 154 of the top wall 112d of the microwave unit 110, respectively. The first opening 124 and the second opening 126 can have any diameter, such as a diameter of 4 cm, suitable to allow the inlet port 152 and the outlet port 154 to extend through the first opening 124 and the second opening 126, respectively. Further, the vessel 122 can include a drainage hose 156 configured for draining any sediment remaining after the water W in the vessel 122 has evaporated.

The condenser unit 120 includes a natural convection condenser 158 positioned in communicating relation to the heat exchange coil 160 and having an inlet 161a configured for receiving water W from the tank 130 and an outlet 161*b* configured for discharging water W into the tank 130. The natural convection condenser 158 communicates with the heat exchange coil 160 through an adapter 166, the adapter 166 having a first end 167*a* and a second end 167*b*. The natural convection condenser 158 is positioned within a first tube 172 having a first end 173*a* coupled to the outlet port 154 of the lid 150 and a second end 173*b* coupled to the first end 167*a* of the adapter 166. The heat exchange coil 160 is positioned within a second tube 178 having a first end 179*a* and a second end 179*b*, the first end 179*a* being coupled to the second end 167*b* of the adapter 166 and the second end 179*b* of the second tube 178 being positioned in communicating relation to a carbon funnel 184 configured for absorbing gases released from the heat exchange occurring in the second tube 178. It is to be understood that the carbon funnel 184 is positioned in communicating relation to a distillate vessel 186, such as a flask, configured for receiving distillate.

The stir bar 190 of the magnetic stirrer 188 can stir the water W within the vessel 122 to maintain the temperature of the water W inside the vessel 122 constant and evenly distributed within the vessel 122. The magnetic stirrer 188 may also allow for even and rapid heating of the water W within the vessel 122.

The tank 130 is configured for discharging water W into the heat exchange coil 160 via a first conduit 192, as illustrated by arrow A', and for receiving water from the heat exchange coil 160 via a second conduit 194, as illustrated by A". It is to be understood that the water flowing from the tank 130 into the heat exchange coil 160 may be cooler than the water flowing from the outlet 161*b* of the heat exchange coil 160 into the tank 130. For example, the water vapor entering the second tube 178 can preheat the water being discharged into the tank 130 via the outlet 161*b* of the heat exchange coil 160. The first conduit 192 includes a first end 193*a* and a second end 193*b*, the first end 193*a* of the first conduit 192 being operatively connected to a socket 196 positioned on the tank 130 and the second end 193*b* of the first conduit 192 being operatively coupled to the inlet 161*a* of the heat exchange coil 160.

The socket 194 is configured for controlling the volume of water in the tank 130. For example, when the water level in the tank 130 reaches a given point, the socket 194 can be opened to release water W into the system 100 via the first conduit 192. When the water level falls below a given level, the socket 196 can be closed to prevent any further discharge of water W from the tank 130 and allow the water level to increase to reach a predetermined level before the socket 196 is reopened.

The first conduit 192 includes a pump 198, such as a conventional 0.1 horse power (hp) aquarium pump, positioned in communicating relation to the socket 196, the pump 198 being configured for propelling the water W from the tank 130 throughout the system 100. The second conduit 194 has a first end 195*a* and a second end 195*b*, the first end 195*a* of the second conduit 194 being coupled to the outlet 161*b* of the heat exchange coil 160 and the second end 195*b* of the second conduit 194 being coupled to the tank 130. The second end 195*b* of the second conduit 194 is positioned in communicating relation to cooling plates 162 configured for cooling the water released from the outlet 161*b* of the heat exchange coil 160. The cooling plates 162 may be positioned in communicating relation to an exhaust fan 164 configured for cooling the cooling plates 162, which, in turn, forces the water through the heat exchange coil 160 and into the tank 130. The vessel 122 receives water via a third conduit 200, as illustrated by A''', the third conduit 200 having a first end 201*a* coupled to the second conduit 194 and a second end 201*b* positioned in communicating relation to the input port 152 of the lid 150.

The tank 130 also includes an entry line 168 through which water, such as ordinary tap water, enters the tank 130. The entry line 168 can include a filter 170, such as a microfilter, configured to remove any impurities from the water, as well as a carbon filter 174 configured for preventing any pollutant gases from entering the tank 130. The filter 170 can be positioned adjacent to the carbon filter 174. The tank 130 can further include a water level apparatus 176 configured to show the amount of water in the tank 130. The water level apparatus 176 can allow a user to maintain the volume of water in the tank 130 constant.

The system 100 further includes a plurality of control valves, such as a first control valve 180*a*, a second control valve 180*b*, a third control valve 180*c*, and a fourth control valve 180*d*, each control valve 180*a*, 180*b*, 180*c*, 180*d* being configured for controlling the flow of water throughout the system 100. For example, the first control valve 180*a* can be positioned along the entry line 168 to control the flow of water into the tank 180, the second control valve 180*b* and the third control valve 180*c* can be positioned along the first conduit 192 and the third conduit 200, respectively, to control the flow of water from the tank 130 into the heat exchange coil 160 and into the vessel 122, respectively, and the fourth control valve 180*d* can be positioned along the drainage hose 156 for draining any sediment remaining after the water W in the vessel 122 has evaporated. Flow meters 182 can also be positioned throughout the system 100 to regulate the flow of water W throughout the system 100, which, in turn, can control the rate at which water vapor condenses. A pressure gauge 202 can be positioned in communicating relation to the vessel 122 to monitor the pressure within the vessel 122.

By way of operation, the user first closes the socket 196 and opens the first control valve 180*a* positioned on the entry line 168 so that ordinary tap water, as illustrated by arrow A, can flow through the filter 170 and the carbon filter 174 and into the tank 130. The first control valve 180*a* can remain open to provide a constant flow of water W into the system 100, so long as the water W does not reach above a predetermined level indicated by the water level 176. Once the ordinary tap water reaches the predetermined level indicated by the water level apparatus 176, the socket 196, as well as the second control valve 180*b* are opened to allow the ordinary tap water to flow through the first conduit 192, as illustrated by arrow A'. The flow meter 182 positioned on the first conduit 192 can be used to regulate the flow of ordinary tap water through the first conduit 192.

The pump 198 can be activated to force the ordinary tap water through the system 100. As the ordinary tap water flows through the first conduit 192, the third water control valve 180*c* may be opened to allow a portion of the ordinary tap water to be diverted from the first conduit 192 through to the second conduit 194 and into the third conduit 200, as illustrated by arrow A''', to fill the vessel 122 through the inlet port 152. The other portion of the ordinary tap water not diverted through the second conduit 194 will continue to flow into the heat exchange coil 160, such a through the inlet 161*a* of the heat exchange coil 160 to the outlet 161*b* of the heat exchange coil 160 connected to the first end 195*a* of the second conduit 194.

Once the vessel 122 has been filled with ordinary tap water up to a predetermined level, the temperature sensor 146 attached to the vessel 122 measures the temperature of the ordinary tap water within the vessel 122. The temperature sensor 146 then sends a signal to the temperature controller 140 positioned outside of the microwave unit 110. If the temperature of the ordinary tap water is less than the boiling point temperature of the water, the temperature controller 140 may activate the microwave unit 110 such that the water within the vessel 122 can reach its boiling point, so that the water evaporates and is converted into vapor. By activating the magnetron 136, energy, in the form of microwaves, can bounce off the curved reflective surfaces of the water contained within the vessel 122, thus providing increased and decreased magnetron activity to eliminate any cold spots within the interior of the vessel 122. If, on the other hand, the temperature of the water W in the vessel 122 is greater than its boiling point, the temperature controller 140 can deactivate the microwave unit 110 to conserve energy.

Once the water W is converted into vapor, the vapor rises and exits the vessel 122 via the outlet port 154 of the lid 150. As the vapor exits the vessel 122, the vapor enters the first tube 172 to come into contact with the natural convection condenser 158. The natural convection condenser 158 can then condense a portion of the vapor inside the first tube 172. The remaining portion of the vapor that is not condensed continues through the adaptor 166 and into the second tube 178 to come in contact with the heat exchange coil 160, the heat exchange coil 160 containing water W having a lower temperature than the water vapor. As the remaining portion of the vapor comes into contact with the heat exchange coil 160, it is condensed and converted into distillate, which may flow through a carbon filter 184 and into the distillate vessel 186. It is to be noted that once the water W flows through the heat exchange coil 160, it is recycled through the system 100.

It is to be understood that the present invention is not limited to the embodiments described above, but encompasses any and all embodiments within the scope of the following claims.

We claim:
1. A microwave-assisted distillation system, comprising:
    a tank configured for receiving water;
    a microwave unit having a plurality of sides, one of the sides having a first opening and a second opening defined therein, the microwave unit including a magnetron, wherein the magnetron is configured to produce microwave radiation within the microwave unit to heat the water contained therein to a predetermined temperature;
    a vessel housed in the microwave unit, the vessel having a lid including an inlet port extending through the first opening and an outlet port extending through the second opening, the vessel being in fluid communication with the tank;
    a temperature sensor positioned in direct communicating relation with the vessel in order to measure the temperature of the water inside the vessel;
    a temperature controller configured for activating the magnetron, the temperature sensor communicating with the temperature controller;
    a magnetic stirrer having a stir bar, the stir bar being disposed in the vessel; and
    a condenser unit, including:
        a natural convection condenser positioned within a first tube having a first end and a second end, the first end of the first tube being coupled to the outlet port of the lid;
        an adapter having a first end and a second end, the first end of the adapter being coupled to the second end of the first tube;
        a second tube having a first end and a second end;
        a heat exchange coil having an inlet configured for receiving water from the tank and an outlet configured for discharging water into the tank, the heat exchange coil being disposed within the second tube, the first end of the second tube being coupled to the second end of the adapter and the second end of the second tube being configured for discharging distilled water into a receiver at least one cooling plate within the tank wherein the at least one cooling plate is coupled to the outlet of the heat exchange coil; and
    wherein the tank includes an exhaust fan in communicating relation with the at least one cooling plate.

2. The microwave-assisted distillation system according to claim 1, further comprising an entry line coupled to the tank, the entry line having a filter and a carbon filter, the filter being positioned adjacent to the carbon filter.

3. The microwave-assisted distillation system according to claim 1, further comprising a power source, the temperature controller selectively receiving power from the power source.

4. The microwave-assisted distillation system according to claim 3, wherein the power source is selected from the group consisting of a generator, solar panels, and wind turbines.

5. The microwave-assisted distillation system according to claim 1, further comprising a pump operatively coupled for pumping the water from the tank throughout the system.

* * * * *